(12) United States Patent
Okazaki (10) Patent No.: US 11,233,908 B2
(45) Date of Patent: Jan. 25, 2022

(54) IMAGE FORMING APPARATUS AND IMAGE FORMING METHOD THAT SHORTEN WAIT TIME WHEN RETURNING FROM A POWER SAVING STATE

(71) Applicant: KYOCERA Document Solutions Inc., Osaka (JP)

(72) Inventor: Yusuke Okazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/127,556

(22) Filed: Dec. 18, 2020

(65) Prior Publication Data

US 2021/0195035 A1 Jun. 24, 2021

(30) Foreign Application Priority Data

Dec. 18, 2019 (JP) .............................. JP2019-227978

(51) Int. Cl.
*H04N 1/00* (2006.01)
(52) U.S. Cl.
CPC ..... *H04N 1/00087* (2013.01); *H04N 1/00037* (2013.01); *H04N 1/00042* (2013.01); *H04N 1/00896* (2013.01)
(58) Field of Classification Search
CPC ........... H04N 1/00087; H04N 1/00037; H04N 1/00896
See application file for complete search history.

(56) References Cited

U.S. PATENT DOCUMENTS

| 2016/0241732 | A1* | 8/2016 | Utoh | H04N 1/00381 |
| 2017/0155793 | A1* | 6/2017 | Masumoto | G06F 3/1288 |
| 2018/0032013 | A1* | 2/2018 | Fukushima | H04N 1/00896 |
| 2018/0146107 | A1* | 5/2018 | Miyamoto | H04N 1/00888 |
| 2018/0284671 | A1* | 10/2018 | Fuse | G03G 15/5004 |

FOREIGN PATENT DOCUMENTS

JP 2015-005930 A 1/2015

\* cited by examiner

*Primary Examiner* — Benjamin O Dulaney
(74) *Attorney, Agent, or Firm* — Hawaii Patent Services; Nathaniel K. Fedde; Kenton N. Fedde (57) ABSTRACT

Provided is an image forming apparatus that shortens the waiting time of a user when returning from a power saving state to an operating state while suppressing power consumption. A return control unit switches a specific device from the power saving state to the operating state when a person is detected by a motion sensor in a situation where the specific device is in the power saving state. A performance recording unit records data of an actual start-up time, which represents a time required to start a specific program when the specific device switches from the power saving state to the operating state, in a non-volatile storage device. A sensitivity setting unit sets the sensitivity of the motion sensor according to the actual start-up time when the specific device is in the power saving state.

7 Claims, 7 Drawing Sheets

IMAGE FORMING APPARATUS AND IMAGE FORMING METHOD THAT SHORTEN WAIT TIME WHEN RETURNING FROM A POWER SAVING STATE

INCORPORATION BY REFERENCE

This application is based on and claims the benefit of priority from Japanese Patent Application No. 2019-227978 filed on Dec. 18, 2019, the contents of which are hereby incorporated by reference.

BACKGROUND

The present disclosure relates to an image forming apparatus that includes a motion sensor.

The image forming apparatus switches a specific device such as a printing device, a printing engine and the like from an operating state to a power saving state when a specified pause condition is satisfied. The pause condition is a conditions such as when a power saving key is operated, or the like. Alternatively, the pause condition may be a condition such as when a state in which a printing process is not required continues for a specified time, or the like.

A typical image forming apparatus may include a motion sensor. In this case, the image forming apparatus automatically switches the specific device from the power saving state to the operating state. This is a case where the motion sensor detects a person while the specific device is in the power saving state.

SUMMARY

The image forming apparatus according to one aspect of the present disclosure includes a processor, a display device, an operation device, a pause control unit, a motion sensor, a return control unit, a performance recording unit, and a sensitivity setting unit. The processor is able to execute a plurality of programs related to a printing process. The display device displays information. The operation device receives operations from a user. The pause control unit, in a case where a specified pause conditions is satisfied, switches a specified device that includes the processor and the displays device from an operating state in which one or more specific program specified in the processor is running and the display device is energized to a power saving state in which the specific program is not started and the display device is not energized at least in the processor. The motion sensor detects a person according to a set sensitivity. The return control unit switches the specific device from the power saving state to the operating state when a person is detected by the motion sensor in a situation where the specific device is in the power saving state. The performance recording unit records data of an actual start-up time, which represents a time required to start a specific program when the specific device switches from the power saving state to the operating state, in a non-volatile storage device. The sensitivity setting unit sets the sensitivity of the motion sensor according to the actual start-up time when the specific device is in the power saving state.

DETAILED DESCRIPTION

Hereinafter, embodiments according to the present disclosure will be described with reference to the drawings. Note that the following embodiments are examples that embody the technique according to the present disclosure, and do not limit the technical scope of the present disclosure.

First Embodiment: Configuration of the Image Forming Apparatus 10

The image forming apparatus 10 according to a first embodiment includes a printing device 1 that executes a printing process for forming an image on a sheet 91. The image forming apparatus 10 executes a job related to the printing process.

Furthermore, the image forming apparatus 10 also includes an image reading device 2 that executes an image reading process for reading an image from a document 92. For example, the image forming apparatus 10 may be a copying machine, a multifunction device having a copying function and a facsimile communication device function, or the like.

The image forming apparatus 10 is able to communicate with other devices such as a host device 8 via the Internet, a network 80 such as a WAN (Wide Area Network), or the like. The host device 8 is a computer capable of communicating with the image forming apparatus 10.

Figure 1:
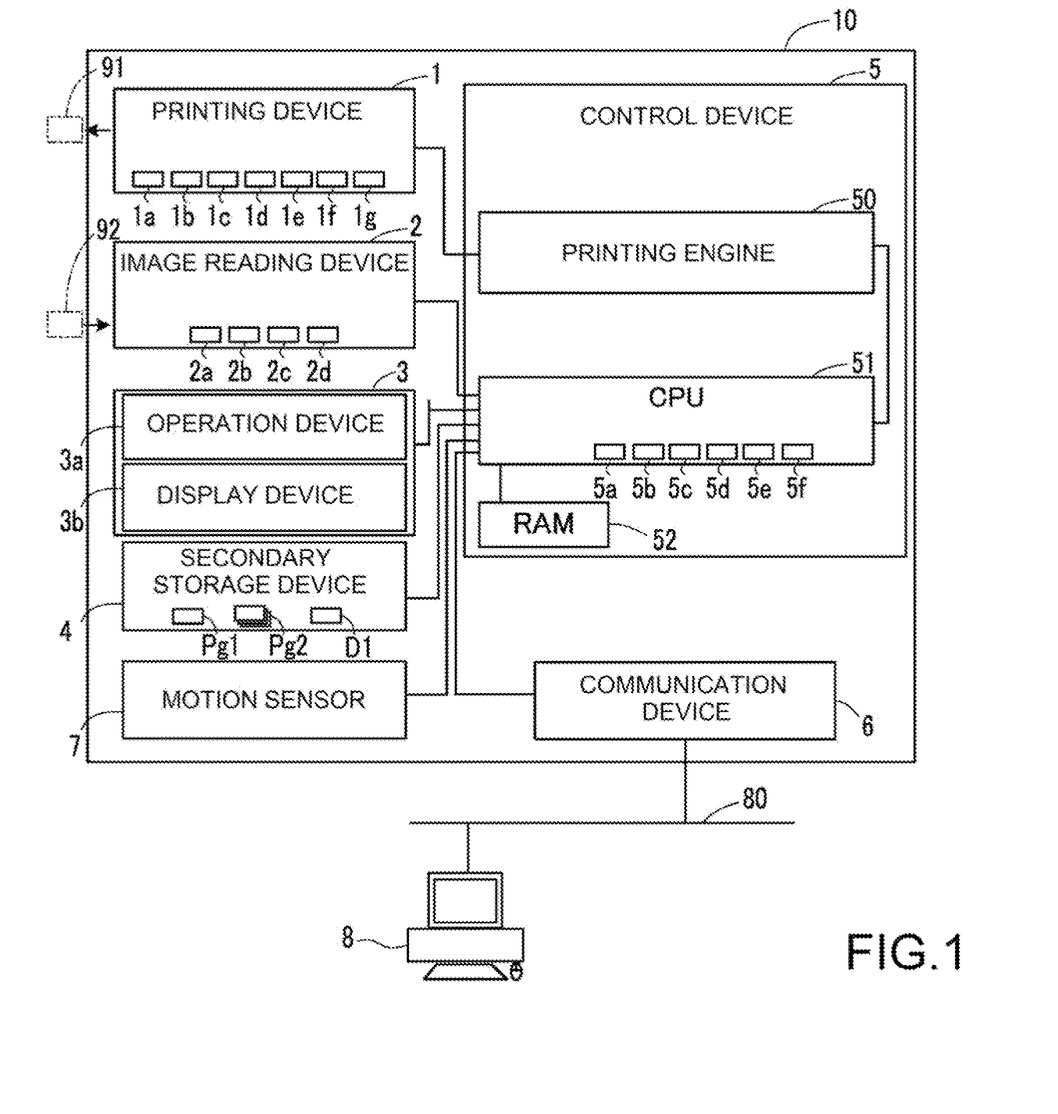
FIG. 1 is a block diagram illustrating a configuration of an image forming apparatus according to a first embodiment.

As illustrated in FIG. 1, the image forming apparatus 10 includes an image reading device 2, a printing device 1, a user interface device 3, a secondary storage device 4, a control device 5, a communication device 6, a motion sensor 7, and the like.

The user interface device 3 includes an operation device 3a and a display device 3b. The operation device 3a is a device that receives user operations. The operation device 3a includes, for example, operation buttons, a touch panel, and the like. The display device 3b includes a display panel such as a liquid crystal panel or the like capable of displaying information.

The communication device 6 is a communication interface device that communicates with other devices such as a host device 8 or the like via a network 80. The control device 5 performs all transmission and reception of data to and from other devices via the communication device 6.

The secondary storage device 4 is a computer-readable non-volatile storage device. The secondary storage device 4 is able to store programs and various data. For example, a combination of one or both of a hard disk drive and an SSD (Solid State Drive) may be used as the secondary storage device 4. Note that the program is a computer program.

The image reading device 2 is a device that executes a reading process for reading an image of a document 92. The image reading device 2 includes a light source 2a, a scanning mechanism 2b, an image sensor 2c, an AFE (Analog Front End) 2d, and the like.

The light source 2a emits light to the document 92. The scanning mechanism 2b scans the document 92 with light of the light source 2a. The image sensor 2c receives the reflected light from the document 92 and outputs a detection signal of the amount of received light as an image signal.

AFE (2d) converts the image signal into digital image data. In the following description, the image read from the document 92 by the reading process of the image reading device 2 is referred to as a read image.

The printing device 1 is a device that executes a printing process of forming an image on a sheet 91 by a specified method such as an electrophotographic method, an inkjet method, or the like.

In the present embodiment, the printing device 1 is able to execute a printing process based on data of the read image or data received from another device via the communication device 6.

For example, when the printing device 1 is a device that executes the printing process in an electrophotographic manner, the printing device 1 includes a sheet conveying mechanism 1a, a photoconductor 1b, a charging device 1c, a laser scanning unit 1d, a developing device 1e, a transfer device 1f, a fixing device 1g, and the like.

The sheet conveying mechanism 1a conveys the sheet 91 along a specified path. The charging device 1c charges the surface of the photoconductor 1b. The laser scanning unit 1d writes an electrostatic latent image on the surface of the charged photoconductor 1b.

The developing device 1e develops the electrostatic latent image on the photoconductor 1b into a toner image. The transfer device if transfers the toner image on the photoconductor 1b to a sheet 91. The fixing device 1g fixes the toner image on the sheet 91 by heating the toner image on the sheet 91.

The motion sensor 7 is a sensor that detects a person existing in front of the image forming apparatus 10. For example, the motion sensor 7 is an infrared sensor, an ultrasonic sensor, or the like.

The control device 5 executes various calculations, data processing, and control of various electric devices included in the image forming apparatus 10. The control device 5 can exchange data and control signals between the image reading device 2, the printing device 1, the user interface device 3, and the communication device 6.

The control device 5 includes a printing engine 50, a CPU 51, a RAM (Random Access Memory) 52, and the like. The printing engine 50 controls the printing device 1 according to a command from the CPU 51. As a result, the printing engine 50 causes the printing device 1 to execute the printing process.

The printing engine 50 includes a circuit. This circuit is a processor such as an MPU (Micro Processing Unit), a DSP (Digital Signal Processor), or the like, or an ASIC (Application Specific Integrated Circuit) or the like.

The CPU 51 is a processor that executes various data processing and control by executing a program stored in the secondary storage device 4. Note that another processor such as a DSP or the like may execute the data processing and control instead of the CPU 51.

The RAM 52 is a storage device that primarily stores the program executed by the CPU 51 and the data to be outputted and referenced during the process of the CPU 51 executing the program.

The program executed by the CPU 51 includes a basic program Pg1. By executing the basic program Pg1, the CPU 51 functions as a processing module that includes a main control unit 5a, a job control unit 5b, a pause control unit 5c, a return control unit 5d, and the like.

The main control unit 5a mainly controls the user interface device 3 and the communication device 6. The job control unit 5b mainly controls the printing engine 50, the image reading device 2, and the like.

For example, the communication device 6 receives a printing request command and printing request data including printing target data from the host device 8. The job control unit 5b outputs a received printing command to the printing engine 50.

When the printing engine 50 receives the received printing command from the job control unit 5b, the printing engine 50 causes the printing device 1 to execute the printing process based on the printing target data.

The pause control unit 5c executes a process of moving a specified specific device from the operating state to the power saving state when a specified pause condition is satisfied. The power saving state is a state in which power consumption is smaller than that of the operating state.

The pause condition is when the power saving button, which is a part of the operation device 3a, is operated, or the like. Alternatively, the pause condition is when a state in which various processes such as the printing process are not required is continued for a specified time, or the like.

The operating state is a state in which the printing device 1, the image reading device 2, the printing engine 50, the CPU 51, the user interface device 3, and the communication device 6 are energized. In the operating state, the image forming apparatus 10 is able to execute processing corresponding to the operation on the operation device 3a and to display information on the display device 3b.

The power saving state is, for example, a state in which the printing device 1, the image reading device 2, the printing engine 50, and the display device 3b are not energized.

Furthermore, in the power saving state, the CPU 51 operates in a sleep mode in which power consumption is less than that in the normal mode in the operating state. For example, the CPU 51 operates in the sleep mode with a clock having a frequency lower than that in the normal mode. The power consumption of the CPU 51 during operation in the sleep mode is less than that during operation in the normal mode.

Note that the printing device 1, the image reading device 2, the display device 3b, the printing engine 50, and the CPU 51 are examples of the specific device.

Note that the CPU 51 may be able to receive a job request through the communication device 6 even when the image forming apparatus 10 is in the power saving state.

When the motion sensor 7 detects a person while the specific device is in the power saving state, the return control unit 5d automatically switches the specific device from the power saving state to the operating state.

Incidentally, the image forming apparatus 10 includes a CPU 51 as a processor that executes various programs. The CPU 51 realizes a standard function related to the printing process by executing the specified basic program Pg1.

In addition, the CPU 51 may execute one or more application programs Pg2 for achieving optional functions.

The type and number of application programs Pg2 installed in the image forming apparatus 10 differ according to user preference.

Figure 2:
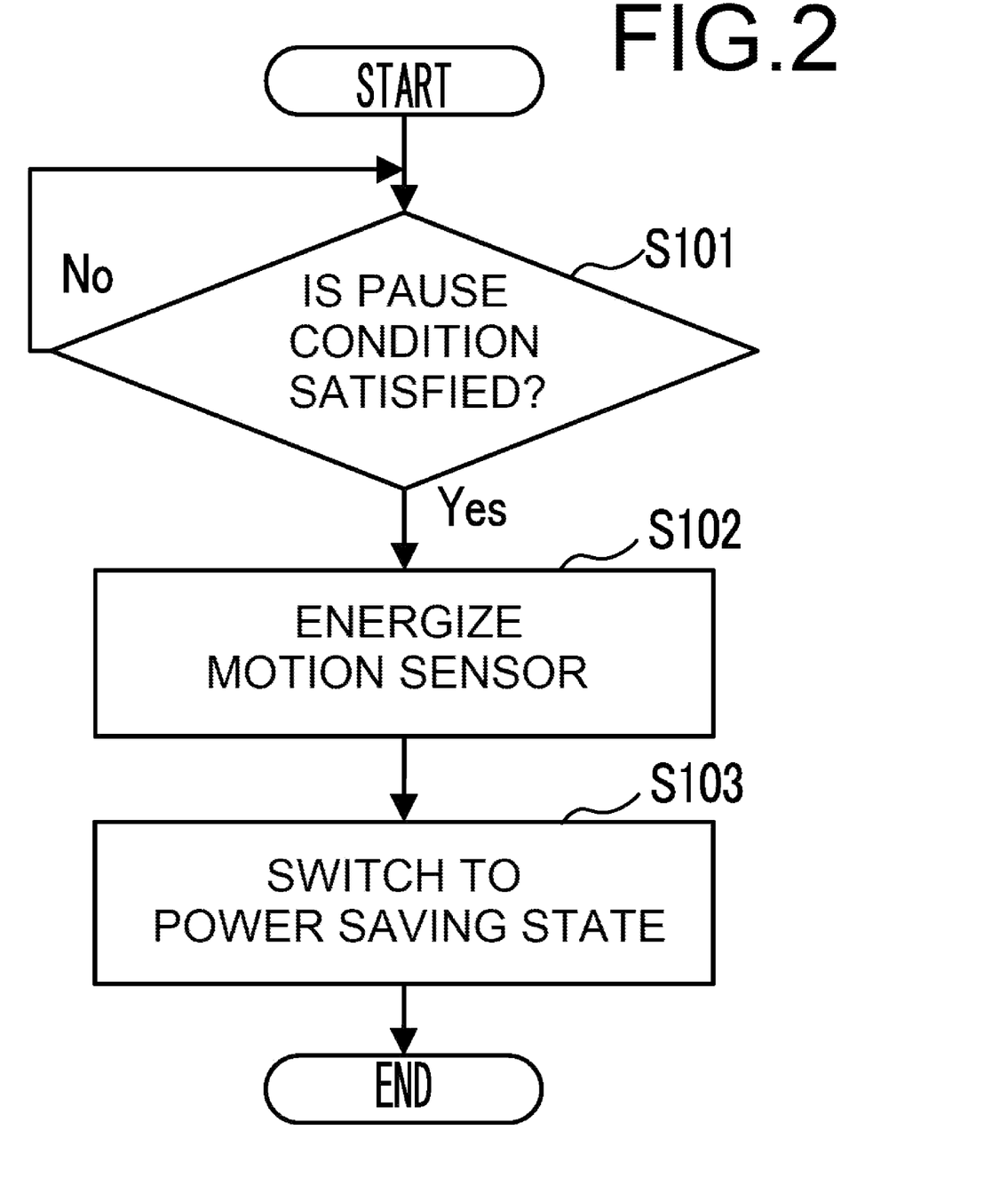
FIG. 2 is a flowchart illustrating an example of a pause control procedure in an image forming apparatus according to a first embodiment.

Note that in the examples illustrated in FIGS. 1 and 2, the basic program Pg1 and one or more application programs Pg2 are stored in the secondary storage device 4.

When the CPU 51 starts an application program Pg2 in response to the detection of the user by the motion sensor 7, the longer the start-up time of the application program Pg2 is, the longer the waiting time may be. This waiting time is the time until the user is able to operate the image forming apparatus 10.

In addition, the start-up time of the application program Pg2 may differ depending on the situation. For example, the startup time may be when the application program Pg2 is started by the CPU 51. The CPU 51 may be made to execute a process of accessing another device such as the host device 8, a server device or the like via the network 80. In this case, the start-up time of the application program Pg2 differs depending on the environment of the network 80.

In this embodiment, the CPU 51 executes pause control and return control described later. As a result, the image forming apparatus 10 suppresses power consumption. In addition, the image forming apparatus 10 may shorten the waiting time of the user when returning from the power saving state to the operating state.

In the operating state, the CPU 51 is in a state in which the basic program Pg1 and the application program Pg2 are started. On the other hand, in the power saving state, the CPU 51 has started a part of the basic program Pg1, but the application program Pg2 has not started. Note that the application program Pg2 is an example of a specific program.

[Pause Control]

Hereinafter, an example of the pause control procedure will be described with reference to the flowchart illustrated in FIG. 2.

The CPU 51 executes the pause control illustrated in FIG. 2 when the specific device is in the operating state. In the following description, S101, S102, and so on represent identification codes for a plurality of steps in the pause control.

<Step S101>

In the pause control, first, the pause control unit 5c determines whether or not the pause condition is satisfied. Then, when the pause control unit 5c determines that the pause condition is satisfied, the pause control unit 5c switches the process to step S102. The pause control unit 5c executes the process of step S101 from time to time as necessary until the pause condition is satisfied.

For example, the pause condition includes a first pause condition. This first pause condition is a condition in which the non-operating state in which no operation on the operation device 3a is detected continues beyond a specified non-operation set time. In addition, the first pause condition is a condition in which processing according to a request from the host device 8 is not left in an incomplete state.

Moreover, the pause condition may also include a second condition in which a specified pause operation has been performed on the operation device 3a. Furthermore, the pause condition may also include a third condition in which the current time has entered a set pause time zone.

For example, it is conceivable that the pause condition is a logical sum of the first pause condition, the second pause condition, and the third pause condition.

<Step S102>

In step S102, the pause control unit 5c controls the power supply circuit to energize the motion sensor 7 from the power supply circuit. The pause control unit 5c switches the process to step S103.

<Step S103>

In step S103, the pause control unit 5c switches the specific device from the operating state to the power saving state. As a result, the pause control ends.

In this way, the processes of steps S102 and S103 are executed. As a result, the motion sensor 7 executes a process of detecting a person approaching the image forming apparatus 10 when the specific device is in the power saving state. At that time, the motion sensor 7 detects a person with a sensitivity that is set in the return control described later.

[Return Control]

Next, an example of the return control procedure will be described with reference to the flowchart illustrated in FIG. 3.

The CPU 51 further includes a performance recording unit 5e and a sensitivity setting unit 5f as the processing module achieved by executing the basic program Pg1.

Figure 3:
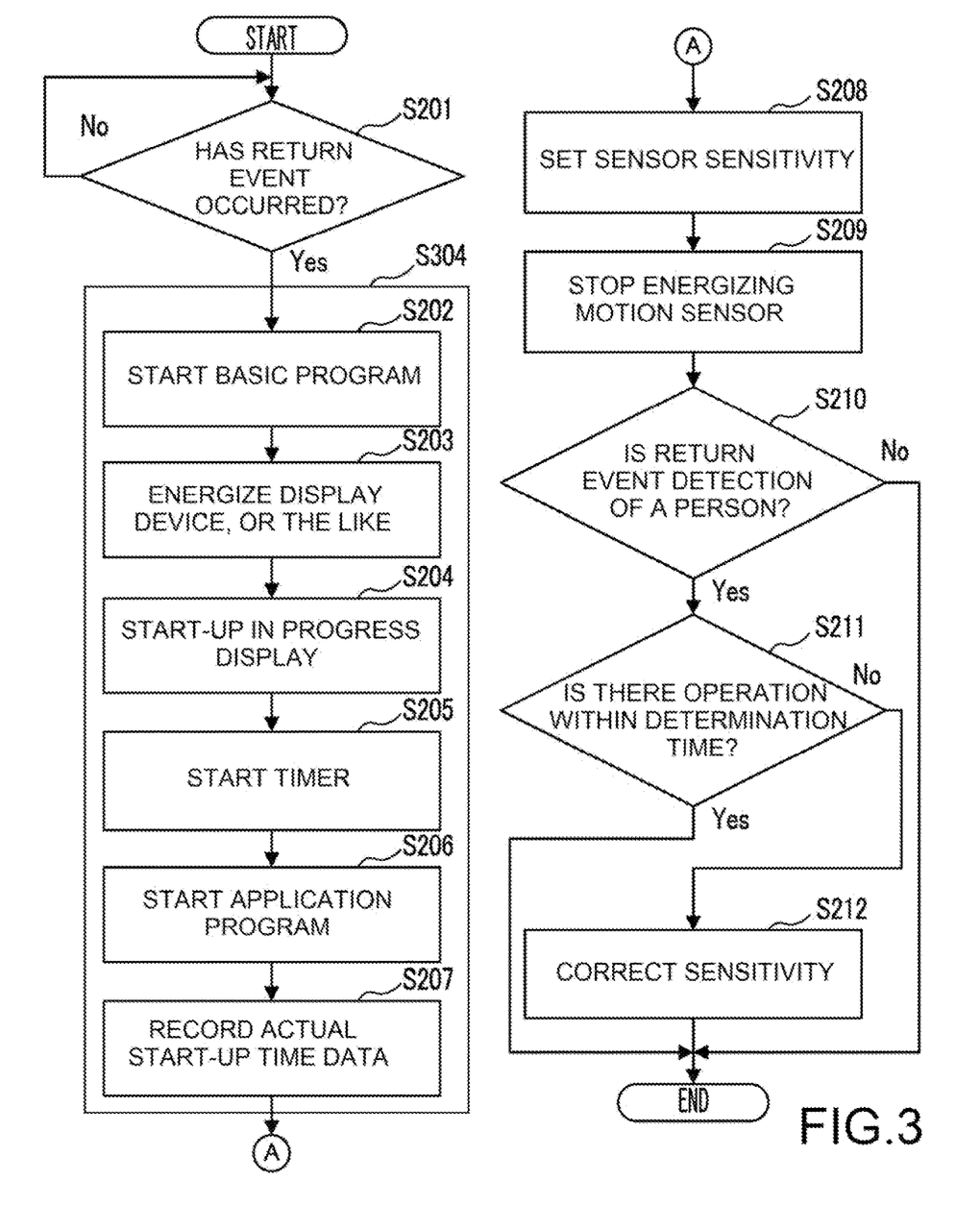
FIG. 3 is a flowchart illustrating an example of a return control procedure in an image forming apparatus according to a first embodiment.

The CPU 51 executes the return control illustrated in FIG. 3 when the specific device is in the power saving state. In the following description, S201, S202, and so on represent identification codes for a plurality of steps in the return control.

<Step S201>

In the return control, first, the return control unit 5d monitors whether or not a specified return event occurs. The return event includes at least the motion sensor 7 detecting a person.

Moreover, the return event may include when the return button included on the operation device 3a is operated. When the return control unit 5d determines that a return event has occurred, the process switches to step S202.

<Step S202>

In step S202, the return control unit 5d switches the CPU 51 from the sleep mode to the normal mode. The return control unit 5d then starts the basic program Pg1 stored in the secondary storage device 4. Furthermore, the return control unit 5d switches the process to step S203.

<Step S203>

In step S203, the return control unit 5d controls the power supply circuit. As a result, the return control unit 5d energizes the printing device 1, the image reading device 2, the printing engine 50, and the display device 3b from the power supply circuit. Furthermore, the return control unit 5d switches the process to step S204.

<Step S204>

In step S204, the return control unit 5d causes the display device 3b to display a notification screen indicating that start-up is in progress. Furthermore, the return control unit 5d switches the process to step S205.

<Step S205>

In step S205, the performance recording unit 5e starts a timer for timing the elapsed time required to start the application program Pg2. Furthermore, the performance recording unit 5e switches the process to step S206.

<Step S206>

In step S206, the return control unit 5d starts one or more specified application programs Pg2. Furthermore, the return control unit 5d switches the process to step S207.

In steps S202 to S204 and step S206, the return control unit 5d switches the specific device from the power saving state to the operating state. This process is performed when a person is detected by the motion sensor 7 in a situation where the specific device is in the power saving state.

<Step S207>

Figure 5:
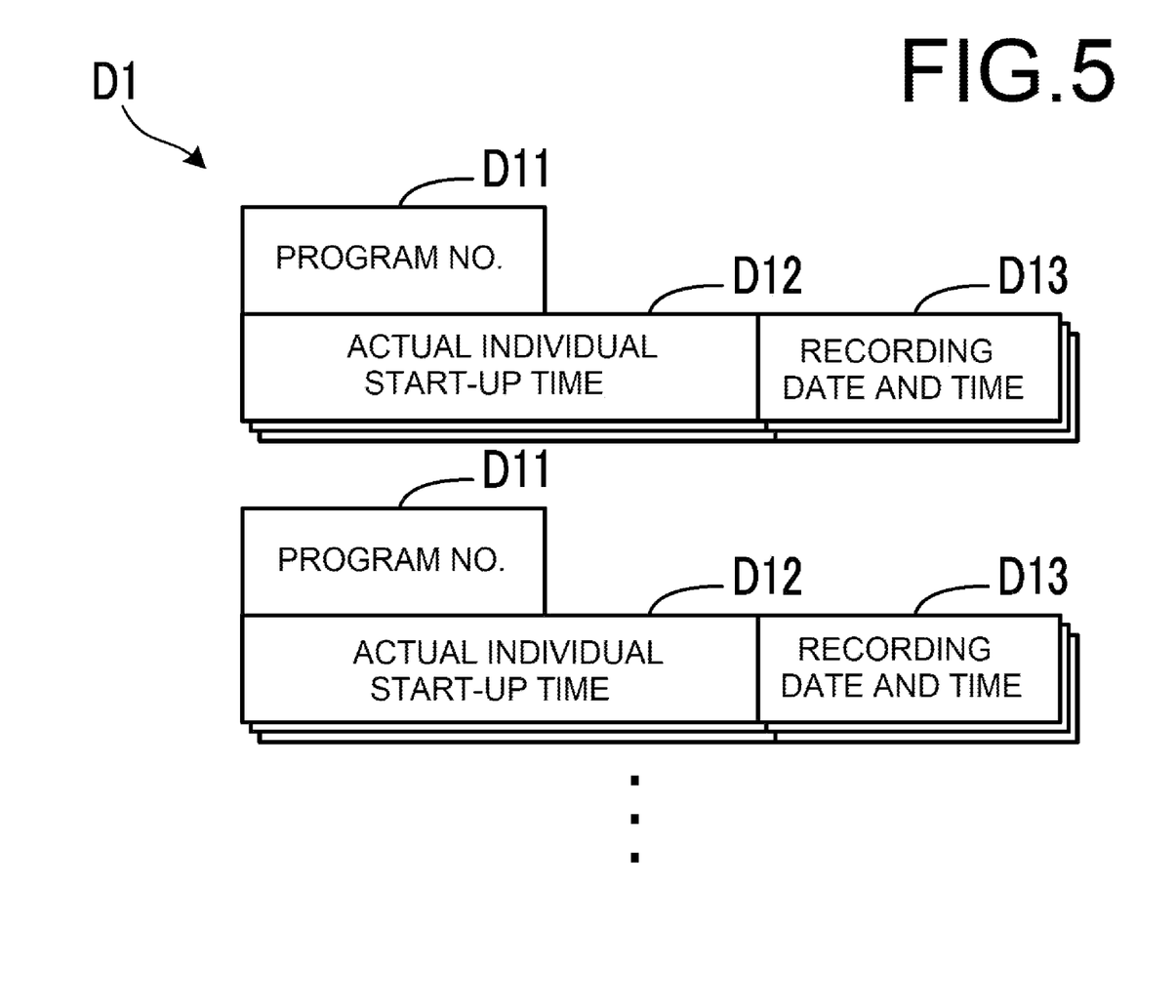
FIG. 5 is a diagram illustrating an example of the configuration of start-up time recording data in an image forming apparatus according to a first embodiment.

In step S207, the performance recording unit 5e records the start-up time recording data D1 in the secondary storage device 4 (see FIGS. 1 and 5). The startup time recording data D1 is data of the actual start-up time representing the time required to start the application program Pg2. Furthermore, the performance recording unit 5e switches the process to step S208.

In the present embodiment, the performance recording unit 5e records the data of the actual individual start-up time D12 in the secondary storage device 4 as the data of the start-up time (see FIG. 5). The actual individual start-up time D12 is data representing the start-up time for each application program Pg2.

In the example illustrated in FIG. 5, the start-up time recording data D1 includes data of the actual individual start-up time D12 and the recording date and time D13. The actual individual start-up time D12 and the recording date and time D13 are correlated with the program number D11 that identifies each of the application programs Pg2.

<Step S208>

In step S208, the sensitivity setting unit 5f sets the sensitivity of the motion sensor 7 when the specific device is in the power saving state according to the actual individual start-up time D12. After that, the sensitivity setting unit 5f switches the process to step S209.

The sensitivity of the motion sensor 7 set in step S208 is reflected in the sensitivity of the motion sensor 7 energized in step S102 of the pause control illustrated in FIG. 2. The sensitivity reflected in the motion sensor 7 in step S102 is the sensitivity of the motion sensor 7 when the specific device is in the power saving state.

In the present embodiment, the sensitivity setting unit 5f sets the sensitivity of the motion sensor 7 according to the total time of the actual individual start-up time D12 corresponding to one or more recent started programs. The one or more most recent started programs are application programs Pg2 that are running when the specific device is finally switched from the operating state to the power saving state.

For example, the sensitivity setting unit 5f derives a representative value of the actual individual start-up time D12 recorded within a specified recent period for each of the recently started programs. On this basis, the sensitivity setting unit 5f uses the total time of the representative values of the actual individual start-up times D12 corresponding to all of the recently started programs to set the sensitivity of the motion sensor 7.

Figure 6:
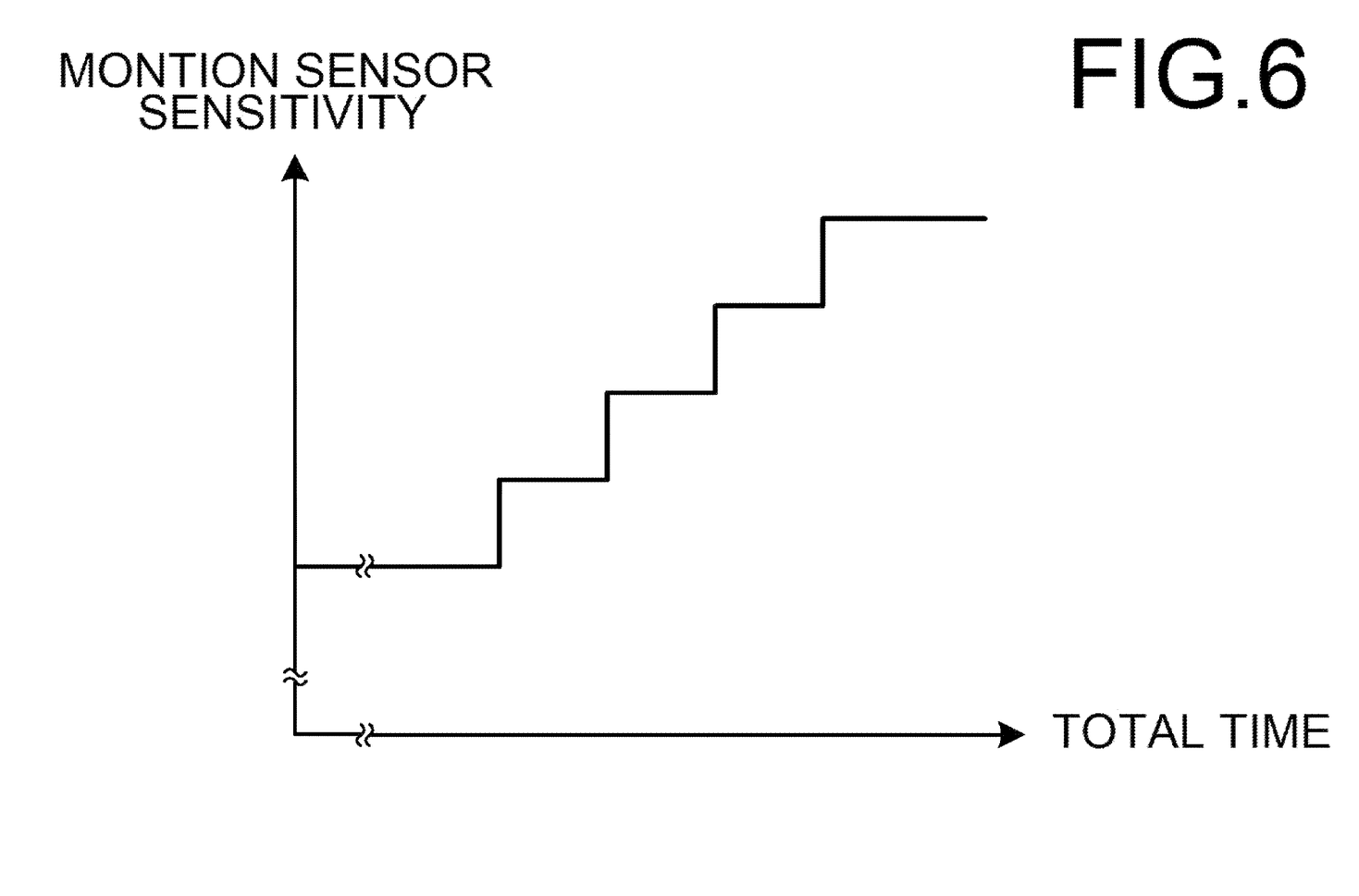
FIG. 6 is a graph illustrating an example of the relationship between the start-up time of an application program and the set sensitivity of the motion sensor.

As illustrated in FIG. 6, in a case where the total time of the actual individual start-up time D12 corresponding to the recently started programs is long, the sensitivity setting unit 5f sets the sensitivity of the motion sensor 7 to a higher sensitivity than when the total time is short.

In the example illustrated in FIG. 6, the sensitivity setting unit 5f selects and sets the sensitivity of the motion sensor 7 from five stages of specified sensitivity candidates. In this way, it is conceivable that the sensitivity setting unit 5f will select the sensitivity of the motion sensor 7 from a specified plurality of stages of sensitivity candidates.

Moreover, the sensitivity setting unit 5f may apply the total time of the actual individual start-up time D12 to a specified calculation formula or a look-up table. As a result, the sensitivity setting unit 5f may set the sensitivity of the motion sensor 7 in an analog manner.

The higher the sensitivity of the motion sensor 7 is set, the further away from image forming apparatus 10 a person may be detected by the motion sensor 7. Therefore, the higher the sensitivity of the motion sensor 7 is set, the faster the user who approaches the image forming apparatus 10 may be detected.

In this way, the motion sensor 7 detects the user approaching the image forming apparatus 10 earlier. Thus, the switching from the power saving state to the operating state of the specific device proceeds by the time the user reaches the image forming apparatus 10. As a result, the waiting time until the user is able to operate the image forming apparatus 10 is shortened.

<Step S209>

In step S209, by controlling the power supply circuit, the return control unit 5d stop the energization of the motion sensor 7. After that, the return control unit 5d switches the process to step S210.

<Step S210>

In step S210, the return control unit 5d switches the process to step S211 in a case where the return event confirmed to occur in step S201 is the detection of a person by the motion sensor 7. Otherwise, the return control unit 5d ends the return control.

<Step S211>

In step S211 the sensitivity setting unit 5f determines whether or not an operation on the operation device 3a has been detected by the time a specified determination time elapses. This determination time is the time after the specific device shifts from the power saving state to the operating state in response to the detection of a person by the motion sensor 7.

The determination time is set based on the maximum time required from the detection of the user approaching the image forming apparatus 10 by the motion sensor 7 until the arrival at the image forming apparatus 10.

Then, in a case where the sensitivity setting unit 5f determines that the operation on the operation device 3a has been detected by the time the determination time elapses, the sensitivity setting unit 5f ends the return control. Otherwise, the sensitivity setting unit 5f switches the process to step S212.

<Step S212>

In step S212, the sensitivity setting unit 5f executes a sensitivity correction process for correcting the sensitivity of the motion sensor 7 and ends the return control. The sensitivity correction process in the present embodiment is a process for correcting the sensitivity of the motion sensor 7 to sensitivity lower than the sensitivity according to the actual individual start-up time D12.

In other words, the sensitivity setting unit 5f corrects the sensitivity of the motion sensor 7 to sensitivity lower than the sensitivity according to the actual start-up time (step S212). This process is executed when the operation on the operation device 3a is not detected until a specified time has elapsed after the specific device is switched from the power saving state to the operating state in response to the detection of a person by the motion sensor 7.

The result of correcting the sensitivity of the motion sensor 7 in the step S212 is reflected in the sensitivity of the motion sensor 7 energized in step S102 of the pause control illustrated in FIG. 2 as well as in the sensitivity set in the step S208.

By the process of step S212, the sensitivity of the motion sensor 7 that has been set excessively high based on the actual individual start-up time D12 is corrected in an appropriate direction.

As described above, the image forming apparatus 10 is able to shorten the waiting time of the user when returning from the power saving state to the operating state while suppressing power consumption.

In the image forming apparatus 10, it is conceivable that a new application program Pg2 will be added between the time when the return control is performed and the time when the pause control is performed. In this case, there is a difference in the type and number of application programs Pg2 between the most recent time and the next execution. The most recent time is when the sensitivity setting of the motion sensor 7 in the return control step S206 is a prerequisite. The next time it is executed, is the time when the return control is executed next time.

Figure 4:
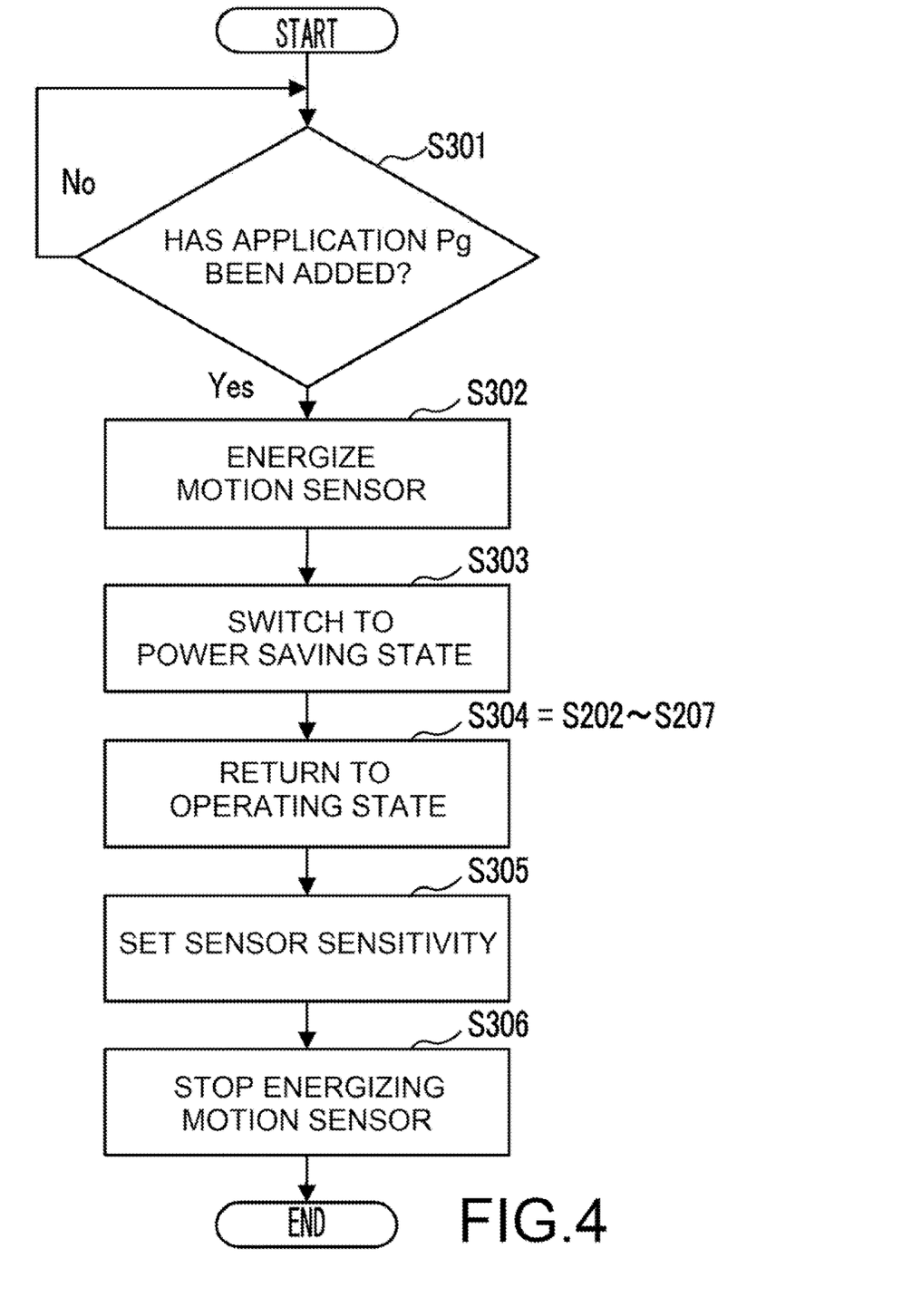
FIG. 4 is a flowchart illustrating an example of a procedure for a program change response process in an image forming apparatus according to a first embodiment.

Therefore, the sensitivity setting unit 5f executes the program change response process shown in FIG. 4 when the specific device is in the operating state.

[Program Change Response Process]

In the following, an example of the procedure for the program change response process will be described with reference to the flowchart illustrated in FIG. 4.

When the specific device is in the operating state, the CPU 51 executes the program change response process illustrated in FIG. 4 in parallel with the pause control illustrated in FIG. 2. In the following description, S301, S302, and so on represent identification codes of the plurality of steps in the program change response process.

<Step S301>

In the program change response process, first, the pause control unit 5c determines whether or not an application program Pg2 has been added. The pause control unit 5c repeats the process of step S301 from time to time as necessary until an application program Pg2 is added.

Then, in a case where it is determined that an application program Pg2 has been added, the pause control unit 5c switches the process to step S302.

<Step S302>

In step S302, the pause control unit 5c controls the power supply circuit to energize the motion sensor 7 from the power supply circuit, and then switches the process to step S303.

<Step S303>

In step S303, the pause control unit 5c switches the specific device from the operating state to the power saving state.

<Step S304>

After the specific device has been switched from the operating state to the power saving state, the return control unit 5d and the performance recording unit 5e execute a work state return process (step S304). The work state return process is the process of steps S202 to S207 in FIG. 3.

By the process of step S304, the start-up time recording data D1 corresponding to the most recent state of the application program Pg2 is recorded in the secondary storage device 4. The performance recording unit 5e switches the process from step S304 to step S305.

<Step S305>

In step S305, the sensitivity setting unit 5f sets the sensitivity of the motion sensor 7 when the specific device is in the power saving state according to the actual individual start-up time D12. This is the same as step S208 in FIG. 2. After that, the sensitivity setting unit 5f switches the process to step S306.

<Step S306>

In step S306, the return control unit 5d controls the power supply circuit. As a result, the return control unit 5d stops the energization of the motion sensor 7. After that, the return control unit 5d ends the program change response process.

As illustrated above, in the present embodiment, the pause control unit 5c switches the specific device from the operating state to the power saving state (step S303). This is the case when an application program Pg2 is added.

Furthermore, the return control unit 5d switches the specific device from the power saving state to the operating state (steps S202 to S204 and S206 of step S304). The performance recording unit 5e records the start-up time recording data D1 in the secondary storage device 4 (steps S205 and S207 of step S304).

Furthermore, the sensitivity setting unit 5f sets the sensitivity of the motion sensor 7 according to the actual individual start-up time D12 (step S305).

The program change response process is executed. As a result, in step S305, the sensitivity of the motion sensor 7 is set based on the start-up time recording data D1 corresponding to the most recent state of the application program Pg2. This is a case in which an application program Pg2 is added.

Note that in the present embodiment, the sensitivity of the motion sensor 7 is set according to the total time of the actual individual start-up time D12 corresponding to the most recently started program. Therefore, in a case where the application program Pg2 is reduced, the sensitivity of the motion sensor 7 is set. This is set in step S208 of FIG. 3 based on the total time of the actual individual start-up time D12 corresponding to the most recent state of the application program Pg2.

With the above configuration, the following effects may be obtained.

A typical image forming apparatus includes a processor that executes various programs. The processor achieves standard functions related to the printing process by executing a specified basic program.

In addition, the processor may execute one or more application programs for achieving optional functions. The type and number of application programs installed in the image forming apparatus differ according to user preference.

The processor starts the application program in response to detection of the user by the motion sensor. In this case, the longer the start-up time of the application program, the longer the waiting time until the user is able to operate the image forming apparatus.

In addition, the start-up time of the application program may differ depending on the situation. For example, the processor may be made to execute a process of accessing another device through a network. For example, this is when the application programs are started by the processor, or the like. In this case, the start-up time of the application program differs depending on the environment of the network.

On the other hand, according to the present disclosure, it is possible to provide an image forming apparatus capable of shortening the waiting time of a user when returning from a power saving state to an operating state while suppressing power consumption.

Second Embodiment

Hereinafter, the image forming apparatus according to a second embodiment will be described with reference to FIG. 7. The image forming apparatus according to the present embodiment has the same configuration as the image forming apparatus 10.

In the first embodiment, the program change response process is executed as a countermeasure when an application program Pg2 is added.

On the other hand, in the image forming apparatus according to the present embodiment, the program change response process is not executed. Instead, in step S208 of FIG. 3, the sensitivity setting unit 5f sets the sensitivity of the motion sensor 7 as will be described below. In this aspect, the image forming apparatus according to this embodiment differs from the image forming apparatus 10.

Figure 7:
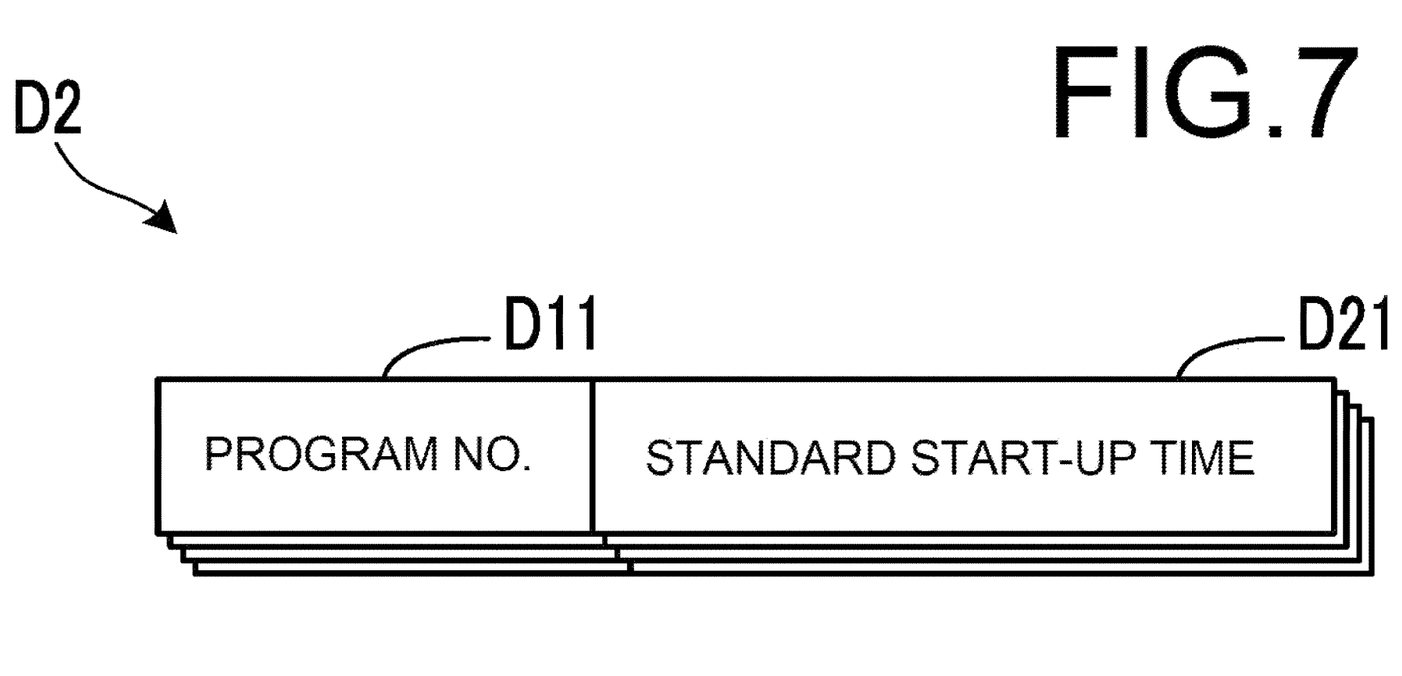
FIG. 7 is a diagram illustrating an example of the configuration of start-up time registration data in an image forming apparatus according to a second embodiment.

In the present embodiment, the start-up time registration data D2 is stored in the secondary storage device 4 (see FIG. 7). The start-up time registration data D2 includes data of a plurality of standard start-up times D21 that are each correlated with the program number D11. The standard start-up time D21 is a standard start-up time specified for each application program Pg2.

The sensitivity setting unit 5f in the present embodiment executes the following alternative processing. This alternative processing is executed in a case where the data of the actual individual start-up time D12 corresponding to the most recently started program is not recorded in the secondary storage device 4. Alternatively, this alternative processing is executed in a case where the data does not meet the specified implementation conditions.

For example, the implementation condition is a condition that the recording date and time D13 corresponding to the actual individual start-up time D12 is within the specified most recent period.

The alternative processing is processing in which the sensitivity of the motion sensor 7 is set using the standard start-up time D21 corresponding to the most recently started program of the standard start-up times D21 specified for each application program Pg2 instead of the actual individual start-up time D12.

Note that in this embodiment as well, as in the first embodiment, processing in a case where the application program Pg2 is reduced is also performed. In other words, in step S208 of FIG. 3, the sensitivity of the motion sensor 7 is set based on the total time of the actual individual start-up time D12 corresponding to the most recent state of the application program Pg2.

First Application Example

Hereinafter, a first application example of the image forming apparatus 10 will be described.

In this application example, the performance recording unit 5e records the actual overall start-up time as the start-up time recording data D1 in the secondary storage device 4. The actual overall start-up time is the time required to start all the application programs Pg2.

Then, in step S208 of FIG. 3, the sensitivity setting unit 5f sets the sensitivity of the motion sensor 7 according to the actual overall start-up time.

Furthermore, the pause control unit 5c in this application example determines whether or not an application program Pg2 has been added or reduced in the step S301 of FIG. 4.

Then, in this application example, the processes of steps S302 to S306 in the program change response process are executed when an application program Pg2 is added or reduced.

In other words, in this application example, in a case where an application program Pg2 is added or reduced, the pause control unit 5c switches the specific device from the operating state to the power saving state (step S303).

Furthermore, the return control unit 5d switches the specific device from the power saving state to the operating state (steps S202 to S204 and S206 of step S304). The performance recording unit 5e records the start-up time recording data D1 in the secondary storage device 4 (steps S205 and S207 of step S304).

Furthermore, the sensitivity setting unit 5f sets the sensitivity of the motion sensor 7 according to the actual individual start-up time D12 (step S305).

In a case where this application example is adopted, the same effect as when the first embodiment is adopted can be obtained

What is claimed is:

1. An image forming apparatus comprising:
a processor that is capable of executing a plurality of programs related to a printing process;
a display device that displays information;
an operation device that receives user operations;
a pause control unit that, in a case where a specified pause condition is satisfied, switches a specified device that includes the processor and the display device from an operating state in which one or more specific programs specified in the processor are running and the display device is energized to a power saving state in which the one or more specific programs are not started and the display device is not energized at least in the processor;
a motion sensor that detects a person according to a set sensitivity;
a return control unit that switches the specified device from the power saving state to the operating state when a person is detected by the motion sensor in a situation where the specified device is in the power saving state;
a performance recording unit that records data of an actual start-up time, which represents a time required to start the one or more specific programs when the specified device switches from the power saving state to the operating state, in a non-volatile storage device; and
a sensitivity setting unit that sets the sensitivity of the motion sensor when the specified device is in the power saving state according to the actual start-up time.

2. The image forming apparatus according to claim 1, wherein
the performance recording unit records the actual individual start-up time data representing the start-up time for each specific program in the storage device as start-up time data; and
the sensitivity setting unit sets the sensitivity of the motion sensor according to the total time of the actual individual start-up time corresponding to the one or more specific programs, wherein the one or more specific programs have been previously started and are running when the specified device finally switched from the operating state to the power saving state.

3. The image forming apparatus according to claim 2, wherein
in a case where a specific program is added, the pause control unit switches the specified device from the operating state to the power saving state, the return control unit switches the specified device from the power saving state to the operating state, the performance recording unit records data of the actual individual start-up time in the storage device, and the sensitivity setting unit sets the sensitivity of the motion sensor according to the actual individual start-up time.

4. The image forming apparatus according to claim 2, wherein
in a case where data of the actual individual start-up time corresponding to the most recently started program is not recorded in the storage device or is data that does not satisfy a specified adopted condition, the sensitivity setting unit sets the sensitivity of the motion sensor by using a standard start-up time corresponding to the recently started program among the standard start-up time determined for each specific program instead of the actual individual start-up time.

5. The image forming apparatus according to claim 1, wherein
in a case where a specific program is added or reduced, the pause control unit switches the specified device from the operating state to the power saving state, the return control unit switches the specified device from the power saving state to the operating state, the performance recording unit records data of the actual start-up time in the storage device, and the sensitivity setting unit sets the sensitivity of the motion sensor according to the actual start-up time.

6. The image forming apparatus according to claim 1, wherein
in a case where an operation on the operation device is not detected until a specified amount of time elapses after the specified device switches from the power saving state to the operating state in response to detection of a person by the motion sensor, the sensitivity setting unit corrects the sensitivity of the motion sensor to a sensitivity lower than the sensitivity according to the actual start-up time.

7. An image forming method that is executed by an image forming apparatus having:
a processor that is capable of executing a plurality of programs related to a printing process;
a display device that displays information;
an operation device that receives user operations; and
a motion sensor that detects a person according to a set sensitivity; and that comprises the steps of:
in a case where a specified pause condition is satisfied, switching a specified device that includes the processor and the display device from an operating state in which one or more specific programs specified in the processor are running and the display device is energized to a power saving state in which the one or more specific programs are not started and the display device is not energized at least in the processor;
switching the specified device from the power saving state to the operating state when a person is detected by the motion sensor in a situation where the specified device is in the power saving state;
recording data of an actual start-up time, which represents a time required to start the one or more specific programs when the specified device switches from the power saving state to the operating state, in a non-volatile storage device; and
setting the sensitivity of the motion sensor according to the actual start-up time when the specified device is in the power saving state.

* * * * *